(12) United States Patent
Cao

(10) Patent No.: US 8,907,956 B2
(45) Date of Patent: Dec. 9, 2014

(54) LINE STROKING METHOD AND SYSTEM

(75) Inventor: Cuong Hung Robert Cao, Panania (AU)

(73) Assignee: Canon Kabushiki Kaisha, Tokyo (JP)

( * ) Notice: Subject to any disclaimer, the term of this patent is extended or adjusted under 35 U.S.C. 154(b) by 1230 days.

(21) Appl. No.: 12/500,444

(22) Filed: Jul. 9, 2009

(65) Prior Publication Data

US 2010/0007664 A1    Jan. 14, 2010

(30) Foreign Application Priority Data

Jul. 14, 2008    (AU) .................................. 2008203110

(51) Int. Cl.
*G06T 11/20* (2006.01)
(52) U.S. Cl.
CPC ................................ *G06T 11/203* (2013.01)
USPC ........................................................ 345/443
(58) Field of Classification Search
CPC ......... G06T 11/203; G06T 11/20; G09G 5/20
USPC ........................................................ 345/443
See application file for complete search history.

(56) References Cited

U.S. PATENT DOCUMENTS

| 5,461,703 | A | | 10/1995 | Goyins et al. | |
|---|---|---|---|---|---|
| 5,600,769 | A | * | 2/1997 | Dao et al. | 345/443 |
| 7,265,757 | B2 | | 9/2007 | Stamm et al. | |
| 7,551,173 | B2 | | 6/2009 | Cao | 345/441 |

FOREIGN PATENT DOCUMENTS

AU    2003202435 A1    10/2003

OTHER PUBLICATIONS

Apr. 15, 2014 Patent Examination Report No. 1 corresponding to Australian Patent Application No. 2009202345.

* cited by examiner

*Primary Examiner* — Jeffery A Brier
(74) *Attorney, Agent, or Firm* — Fitzpatrick, Cella, Harper & Scinto

(57) ABSTRACT

A method for generating an outline for a stroked line of specified width from an input line (601) defined by a vector having two input points (P0, P1) is disclosed. The method comprises the steps of: determining an offset vector based on the vector, the offset vector having components [Xoff, Yoff]; determining a first set of two pairs of points (L1, L2 and R1, R2) based on the offset vector applied to the two input points (P0, P1); and determining a second set of two pairs of points (L0, L3 and R0, R3) based on the first set of points (L1, L2 and R1, R2). The second set of two pairs of points (L0, L3 and R0, R3) defines at least a portion of the outline and one of the components of the offset vector [Xoff, Yoff] is independent of the inclination of the vector and the specified width.

20 Claims, 11 Drawing Sheets

LINE STROKING METHOD AND SYSTEM

BACKGROUND OF THE INVENTION

1. Field of the Invention

The present invention relates to computer graphics rendering and, more particularly, to methods, systems and computer programs for generating a boundary or an outline for stroking a thin line.

2. Related Application

Australian Patent Application No. 2003202435 entitled "Generating an outline of a stroked path" has the same inventor and applicant as the present application. The contents of Australian Patent Application No. 2003202435, which was published on 23 Oct. 2003, are incorporated herein by reference.

3. Background

The introduction of personal computers popularized the use of computer graphic systems for user-computer interaction. Computer graphics systems typically display and/or print text, images, polygons, paths, lines and many other objects. Such paths may comprise line and/or curve segments, which may be stroked to give an appearance of width when displayed or printed by a computer graphics rendering system. Path or line stroking is particularly useful in drawing and printing applications and in display device software such as video drivers, printer drivers, and input device drivers (e.g., in mouse-driven interactive CAD systems).

Computer graphics systems typically stroke paths in one domain before the paths are transformed to another domain (i.e., a device domain) for rendering. Numerous existing computer graphics systems employ stroking methods that approximate paths as line segments and then stroke the paths in the required domain. The result is a series of line segments that describe an outline of a fill area, which is known as a stroked outline. The stroked outline is transformed to a device domain prior to rendering.

A stroked path is typically drawn with a specified pen width, end cap style, and join style. An end cap is required at the start and the end of a stroked path. Computer graphics systems typically provide butt end caps, square end caps, and round end caps.

A join is required between 2 adjoining stroking lines where the tangent at the end of the previous curve is unequal to the tangent at the beginning of the next curve. Computer graphics systems typically provide mitre joins, bevel joins, and round joins.

In computer graphics systems that do not include an anti-aliasing rendering technique and in which a Raster Image Processor (RIP) responsible for generating pixels has limited x and y resolution (e.g., a known RIP has 28.4 fixed point x and y resolution, which has a smallest unit of 1/16 of a pixel), a problem arises when the stroking line is non-vertical and non-horizontal, and the stroking width in device space is less than a certain threshold (e.g., about 10 pixel units). The problem results from non-uniformity of the fill area for a stroked line and manifests visually as inconsistencies in thickness of stroked lines of different inclination and/or direction.

Techniques have been devised to address this problem, however, these have not been altogether successful. One such technique is disclosed in U.S. Pat. No. 5,461,703, entitled "Pixel Image Edge Enhancement Method and System", which was issued to Goyins et al. and was published on 24 Oct. 1995. The technique generates approximately square ends for a fill area. However, the technique does not appear to achieve good results for all thin lines. Furthermore, the left and right lines are asymmetric about the centre stroking line and the additional adjustment to square up the end caps does not ameliorate this asymmetric problem.

FIG. 1 shows stroked lines of varying angles of inclination between 0 and 360 degrees generated by prior art methods. The concentric circles 100 in FIG. 1 enclose multiple stroked lines of varying angles of inclination between 0 and 360 degrees. Inconsistencies in stroked line thickness at certain angles of inclination, for example, the lines at 101 and 102, are clearly discernable as darker and lighter lines, respectively, in the rasterized image of FIG. 1. The problem commonly occurs where many thin lines of similar slope are drawn close to each other.

A need therefore exists to substantially overcome, or at least ameliorate, one or more disadvantages associated with existing arrangements. Another need exists to provide an improved raster-graphics imaging system capable of generating improved stroked outlines, particularly when the pen width is between 1 and 10 pixels or rendering device units.

SUMMARY

An aspect of the present invention provides a method for generating an outline for a stroked line of specified width from an input line defined by a vector having two input points. The method comprises the steps of: determining an offset vector based on the vector, the offset vector having components [Xoff, Yoff]; calculating a first set of two pairs of points based on the offset vector applied to the two input points; and computing a second set of two pairs of points based on the first set of points. The second set of two pairs of points defines at least a portion of the outline and one of the components of the offset vector [Xoff, Yoff] is independent of the inclination of the vector and the specified width.

The step of determining the offset vector may comprise the sub-steps of: determining which octant in a plane of the input line the vector lies in and determining the offset vector based on the octant determined.

The second set of two pairs of points may be determined based on a projection of the first set of points onto a second line and a third line, each of said second and third lines perpendicular to the input line and intersecting the input line at the two input points.

Each of the first set of two pairs of points may define a respective line substantially parallel to the input line and each of the substantially parallel lines may be disposed on an opposite side of the input line substantially equidistantly to the input line.

In one embodiment, one of the offset vector components [Xoff, Yoff] comprises a constant value of 0.5 and the other of the offset vector components comprises a value of half the specified width.

The offset vector may be of the form N*[Xoff, Yoff], where N is a positive integer less than the greater of the absolute x value and absolute y value of the vector.

A stroked outline for two adjoining input lines may be generated by joining respective ones of the second set of two pairs of points of each of the two adjoining input lines and adding an end cap to the other respective ones of the second set of two pairs of points of each of the two adjoining input lines.

Another aspect of the present invention provides a computer system for generating an outline for a stroked line of specified width from an input line defined by a vector having two input points. The computer system comprises: memory for storing data and instructions to be performed by a processor; and at least one processor coupled to the memory. The at least one processor is programmed to: determine an offset vector based on the vector, the offset vector having components [Xoff, Yoff]; calculate a first set of two pairs of points based on the offset vector applied to the two input points; and compute a second set of two pairs of points based on the first set of points. The second set of two pairs of points define at least a portion of the outline and one of the components of the offset vector [Xoff, Yoff] is independent of the inclination of the vector and the specified width.

Another aspect of the present invention provides a computer program product comprising a computer readable medium having a computer program recorded thereon for generating an outline for a stroked line of specified width from an input line defined by a vector having two input points. The computer program comprises: computer program code means for determining an offset vector based on the vector, the offset vector having components [Xoff, Yoff]; computer program code means for calculating a first set of two pairs of points based on the offset vector applied to the two input points; and computer program code means for computing a second set of two pairs of points based on the first set of points. The second set of two pairs of points define at least a portion of the outline and one of the components of the offset vector [Xoff, Yoff] is independent of the inclination of the vector and the specified width.

BRIEF DESCRIPTION OF THE DRAWINGS

One or more embodiments of the invention will now be described with reference to the following drawings, in which.

DESCRIPTION OF RELATED ART

It is to be noted that while certain documents and/or disclosures referred to in the foregoing "Related Application" and "Background" sections may form part of the prior art base (e.g., by virtue of publication), such should not be interpreted as a representation by the present inventor(s) or patent applicant that such disclosures or documents in any way form part of the common general knowledge in the art.

A small number of embodiments of the present invention are described hereinafter with reference to the accompanying drawings.

Figure 2:
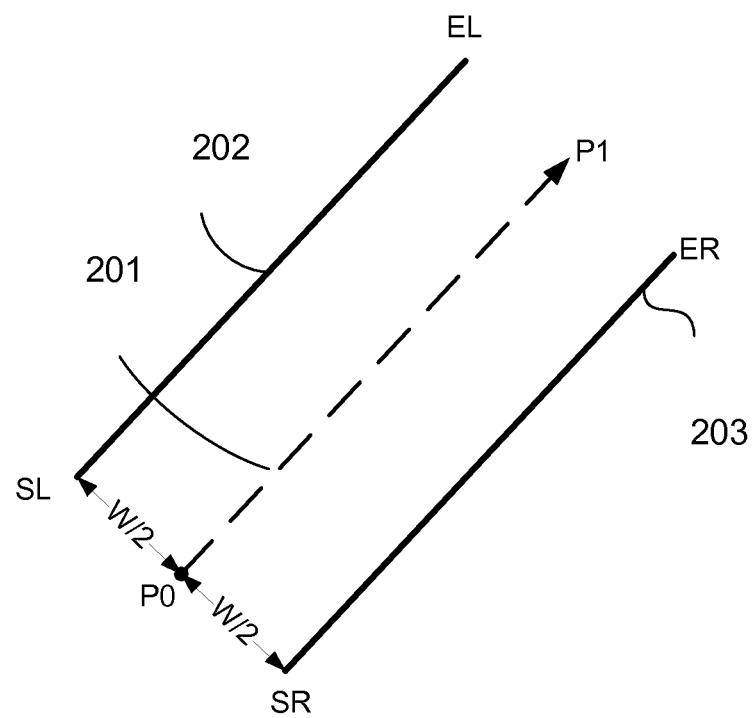
FIG. 2 is a diagram for describing generation of a stroked line.

FIG. 2 depicts stroking of a line (or line segment) 201. Referring to FIG. 2, the line 201 has a starting point P0 and an end point P1. The line 201 is stroked with a pen of width W. A general method for stroking the line 201 comprises three main steps:

(i) generate a left parallel line 202 (SL-EL) and a right parallel line 203 (SR-ER) from the line 201 (P0-P1) by shifting the line 201 by half the stroking width (W/2) in a direction perpendicular to the direction of the line 201 such that the line 202 (SL-EL) is on the left of the line 201 (P0-P1) and such that the line 203 (SR ER) is on the right of the line 201 (P0-P1);

(ii) generate a start cap and an end cap for the open stroke path, which may comprise multiple stroked line segments; and (iii) generate a join between adjoining stroked line segments, if applicable.

Figure 3:
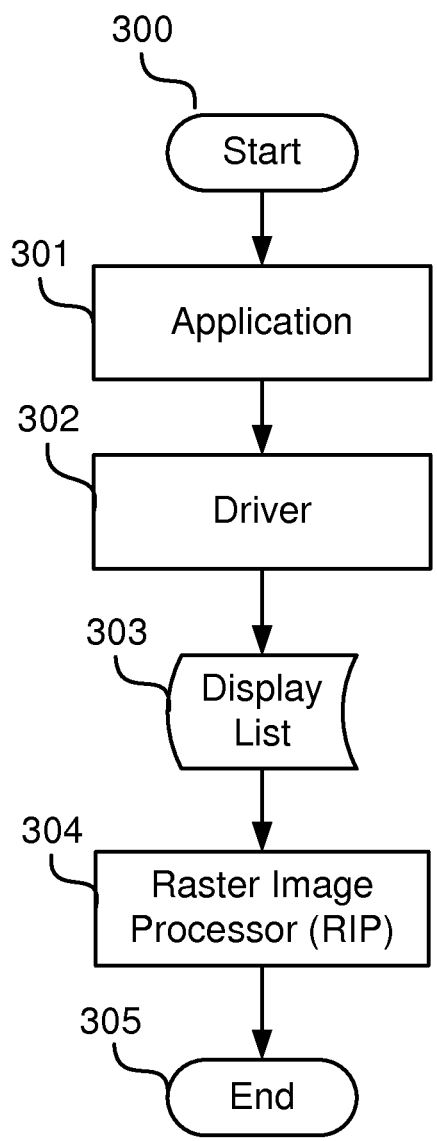
FIG. 3 is a schematic flow diagram for describing operation of a typical raster image processing system.

FIG. 3 is a schematic flow diagram for describing operation of a typical raster image processing system according to an embodiment of the present invention. The method can be implemented as at least part of an application program resident on a storage device 1009, as described hereinafter with reference to FIG. 10, or may be invoked when a printing function is selected by another application executing on a computer system such as the computer system 1000 described hereinafter with reference to FIG. 10. The other application may be any source of printable data such as a word processing application, a browser, a graphics drawing package and so forth. Particularly, the method/s disclosed in the present invention operate/s on printable data with lines to be stroked. In this regard, the method disclosed in FIG. 3 may execute within the computer module 1001 to stroke the lines for reproduction or rendering on a printer 1015, or alternatively execute within a printer 1015 which receives the printable data from the computer module 1001 and performs the line stroking as part of the reproduction or rendering process.

FIG. 3 shows an Application process 301 which sends drawing commands to a Driver process 302. The Driver process 302 generates a Display List 303 in a format suitable for conversion by a Raster Image Processor (RIP) process 304 into an image for rendering (e.g., printing or displaying). The actual Application process 301, Display List 303, and Raster Image Processor RIP process 304 are not directly relevant to the present invention and will thus not be described in further detail.

A stroke command may be issued by the Application process 301 when a line or path of specified pen width is required to be stroked. When the Driver process 302 receives such a stroking command, the Driver process 302 generates an outline or a boundary for describing a shape filling area that represents the stroked line and converts the outline into the Display List 303 format. Embodiments of the present invention described hereinafter relate to the generation of such outlines, particularly when the stroking pen width is thin, such as between 1 and 10 pixels wide.

Figure 4:
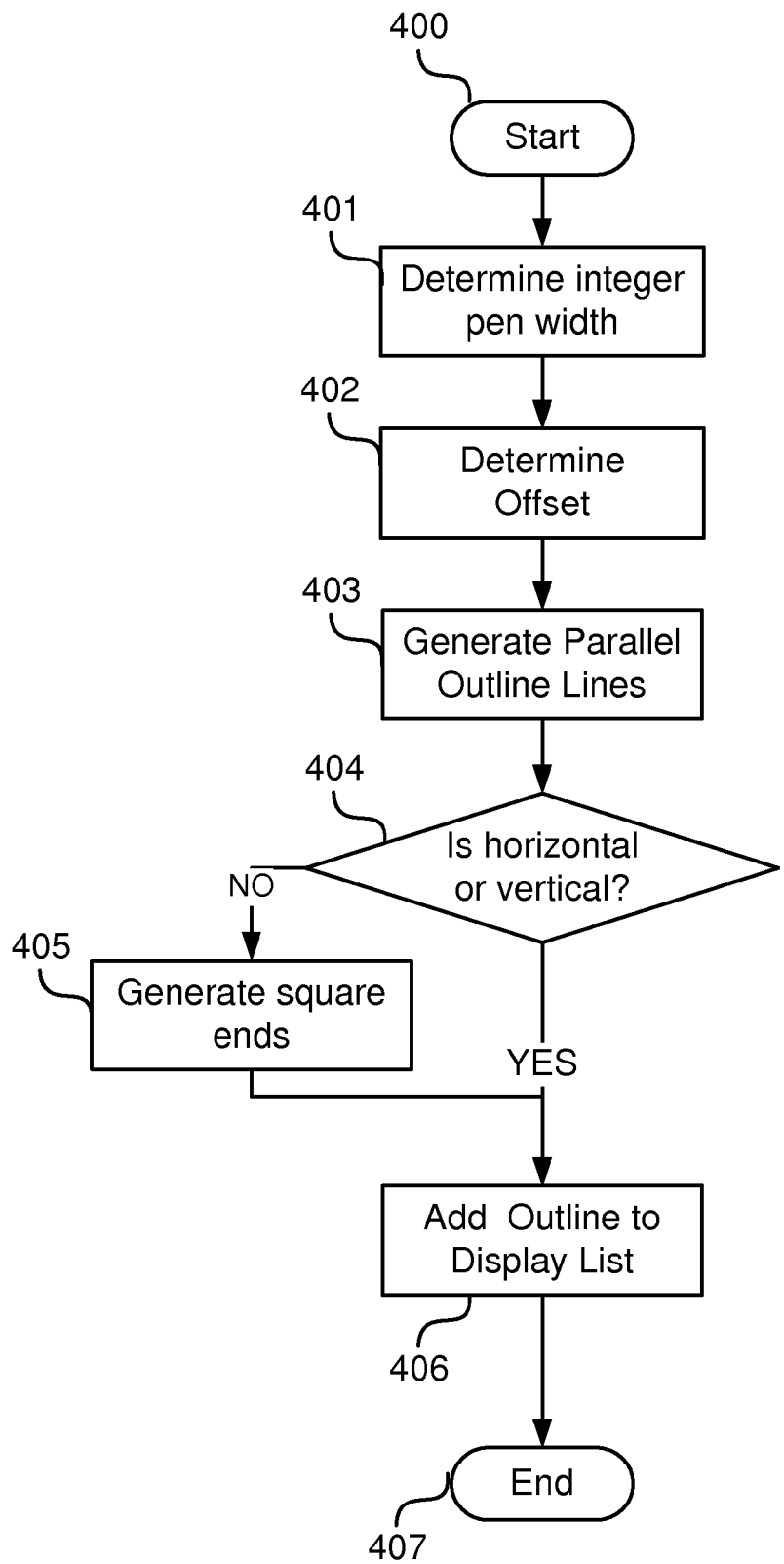
FIG. 4 is a schematic flow diagram of a method for generating an outline of a stroked line in accordance with an embodiment of the present invention.

FIG. 4 is a schematic flow diagram of a method for generating an outline of a stroked line in accordance with an embodiment of the present invention. The method of FIG. 4 may be performed by the Driver process 302 described hereinbefore with reference to FIG. 3. The method of FIG. 4 is described hereinafter with reference to the stroked line example of FIG. 6A. More specifically, the Driver process 302 may execute the method of FIG. 4 to stroke line 601 having start and end points P0 and P1, respectively.

The method of FIG. 4 starts at step 400. A stroking or pen width supplied to the Driver process 302 by the Application process 301 is converted to an integer value of pen width W, in determining step 401. If the pen width W is a non-integer value, it is rounded to the nearest integer value. If the pen width W is zero, it is set to a value of 1.

Then, in step 402, an offset vector [Xoff, Yoff] is determined based on the integer pen width W determined in determining step 401 and the angle of inclination and direction of the input or stroking line 601. This step is now described in further detail with reference to FIG. 5.

Figure 5:
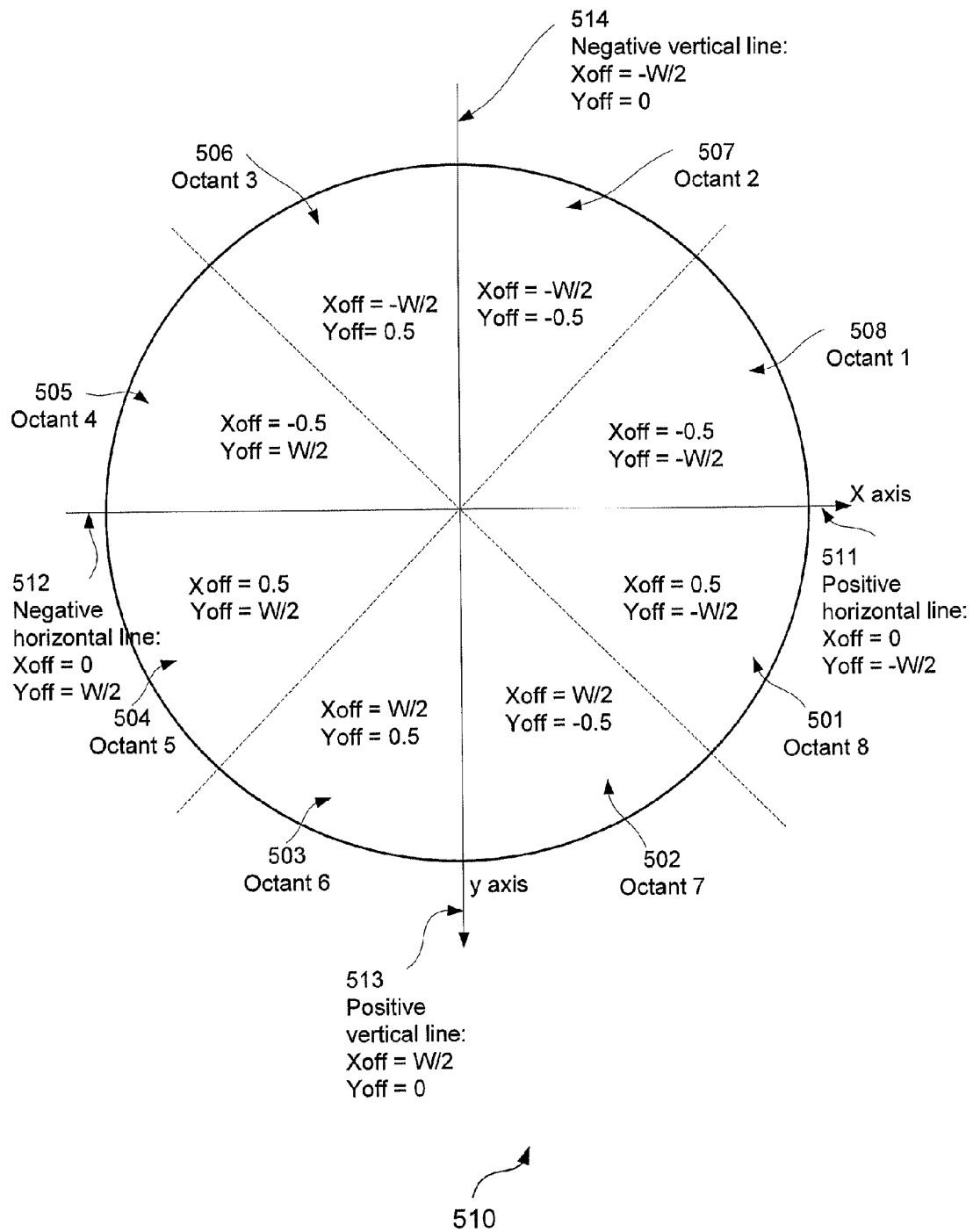
FIG. 5 is a graphical representation for offset [Xoff, Yoff] determination in accordance with an embodiment of the present invention.

Referring to FIG. 5, the stroking line 601 (or a vector representation thereof) is approximately categorized into one of eight octants of a unit circle 510 in the plane of the vector representation or stroking line 601. Each octant of the unit circle 510 has a specified offset vector [Xoff, Yoff], where one of the absolute values of the x and y components of the offset vector is equal to half of the integer stroking width W (i.e., W/2) and the other of the absolute values of the x and y components is equal to a constant value of 0.5. This presumes that the target Raster Image Processor (RIP) has a x and y resolution of at least half a pixel.

Starting from the positive X axis 511 and proceeding in an anticlockwise direction around the unit circle 510, the first octant 508 lies between 0 and 45 degrees, where the offset vector [Xoff, Yoff] is [−0.5, −W/2]. The second octant 507 lies between 45 and 90 degrees, where the offset vector [Xoff, Yoff] is [−W/2, −0.5]. The third octant 506 lies between 90 and 135 degrees, where the offset vector [Xoff, Yoff] is [−W/2, 0.5]. The fourth octant 505 lies between 135 and 180 degrees, where the offset vector [Xoff, Yoff] is [−0.5, W/2]. The fifth octant 504 lies between 180 and 225 degrees, where the offset vector [Xoff, Yoff] is [0.5, W/2]. The sixth octant 503 lies between 225 and 270 degrees, where the offset vector [Xoff, Yoff] is [W/2, 0.5]. The seventh octant 502 lies between 270 and 315 degrees, where the offset vector [Xoff, Yoff] is [W/2, −0.5]. The eighth octant 501 lies between 315 and 360 degrees, where the offset vector [Xoff, Yoff] is [0.5, −W/2].

The angle of inclination and direction of the stroking line 601 can be categorized into one of the predefined eight octants in FIG. 5 using the sign and value of both of the x and y components of the stroking vector (P0-P1) representative of the stroking line 601. For example, the pen width may be given to be 4.0. At step 401, the integer pen width W is determined to be 4. The stroking line 601 has a start point P0 and an end point P1 at coordinates [2, 6] and [9, 3], respectively. The angle of inclination of the stroking line 601 is approximately −23 degrees anticlockwise. Referring to FIG. 5, the angle of inclination falls within the first octant 508, for which the offset vector [Xoff, Yoff] is [−0.5, −W/2]. Since the integer pen width is 4, the offset vector [Xoff, Yoff] is [−0.5, −2].

The offset vector [Xoff, Yoff] generated in step 402 of FIG. 4 can be generalised by multiplying the offset vector with a positive integer scaling factor N for non-horizontal or non-vertical stroking lines. For a positive integer N that is less than the greater of the absolute x value or absolute y value of the vector P0-P1, the offset vector can be calculated in the general form:

Offset vector=$N*[Xoff,Yoff]$

For the special cases of the stroking line 601 being either horizontal or vertical, the offset vector [Xoff, Yoff] is specified as:

[0, −W/2] when the line is a positive horizontal line 511;
[0, W/2] when the line is a negative horizontal line 512;
[W/2, 0] when the line is a positive vertical line 513; and
[−W/2, 0] when the line is a negative vertical line 514.

Returning to the method of FIG. 4 and with reference to the stroking line 601 in the example of FIG. 6A, at step 403, four points L1, L2, R1, R2 for defining outlines parallel to the stroking line 601 are generated as follows:

$L1 = P0 + [Xoff, Yoff]$;

$L2 = P1 + [Xoff, Yoff]$;

$R1 = P0 − [Xoff, Yoff]$; and $R2 = P1 − [Xoff, Yoff]$.

Figure 6A:
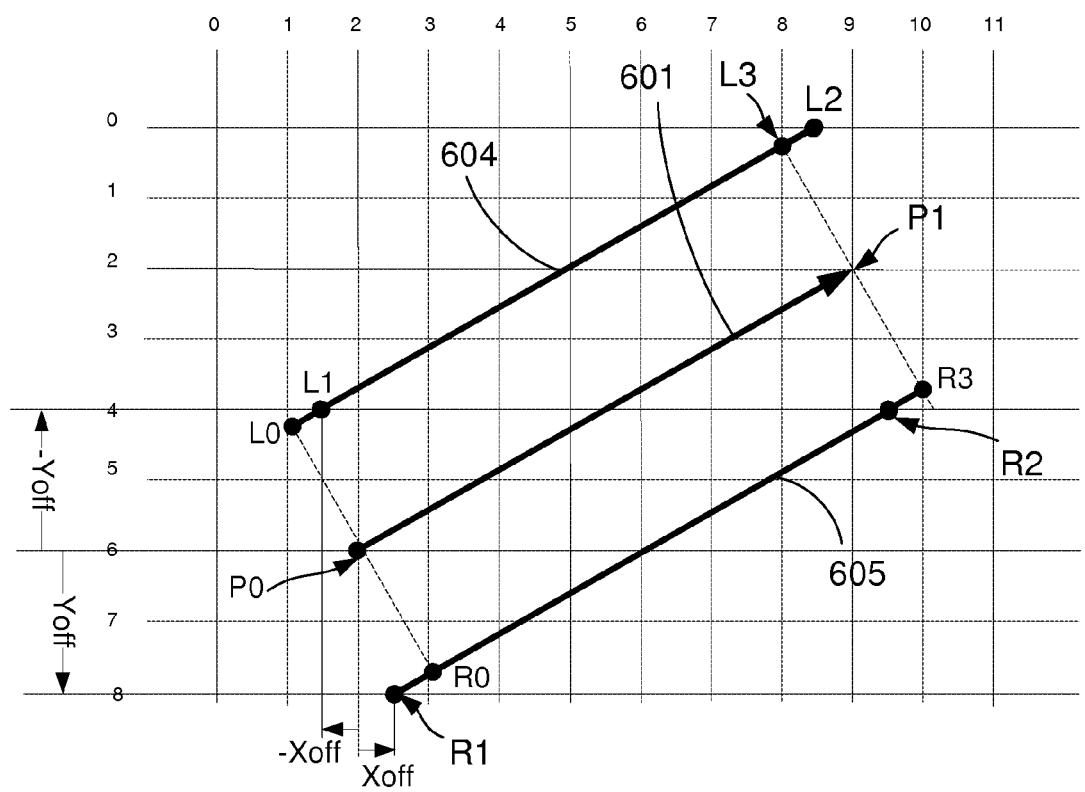
FIG. 6A is a diagram showing generation of a stroked line in accordance with an embodiment of the present invention.

Returning to the example shown in FIG. 6A, the line 604 defined by points L1 and L2 is the stroking line 601 shifted by the offset [Xoff, Yoff]. The line 604 is on the left side of the stroking line 601. Similarly the line 605 defined by points R1 and R2 is the stroking line 601 shifted by the offset [−Xoff, −Yoff]. The line 604 is on the right side of the stroking line 601. In the example of FIG. 6A where the offset vector [Xoff, Yoff] is [−0.5, −2], the four points L1, L2, R1 and R2 are:

$L1 = P0 + [Xoff, Yoff] = [2,6] + [−0.5,−2] = [1.5,4]$ $L2 = P1 + [Xoff, Yoff] = [9,2] + [−0.5,−2] = [8.5,0]$ $R1 = P0 − [Xoff, Yoff] = [2,6] − [−0.5,−2] = [2.5,8]$ $R2 = P1 − [Xoff, Yoff] = [9,2] − [−0.5,−2] = [9.5,4]$ The offset vector [Xoff, Yoff] is worked out in such a way that the points L1 and L2 of line 604 (L1-L2) and the points R1 and R2 of line 605 (R1-R2) are symmetrical about the points P0 and P1 of line 601 (P0-P1), respectively. Furthermore the absolute distance between point L1 and point R1 is the integer value W in either the x or y directions and "1" in the other of the x or y directions.

For example when the absolute x component of vector P0-P1 is greater than the y component of vector P0-P1, the absolute x distance between point L1 and point R1 is the integer width W, and the absolute y distance between point L1 and point R1 is 1. Similarly, the absolute x distance between the point L2 and the point R2 is the integer width W, and the absolute y distance between the point L2 and the point R2 is the value 1.

Figure 1:
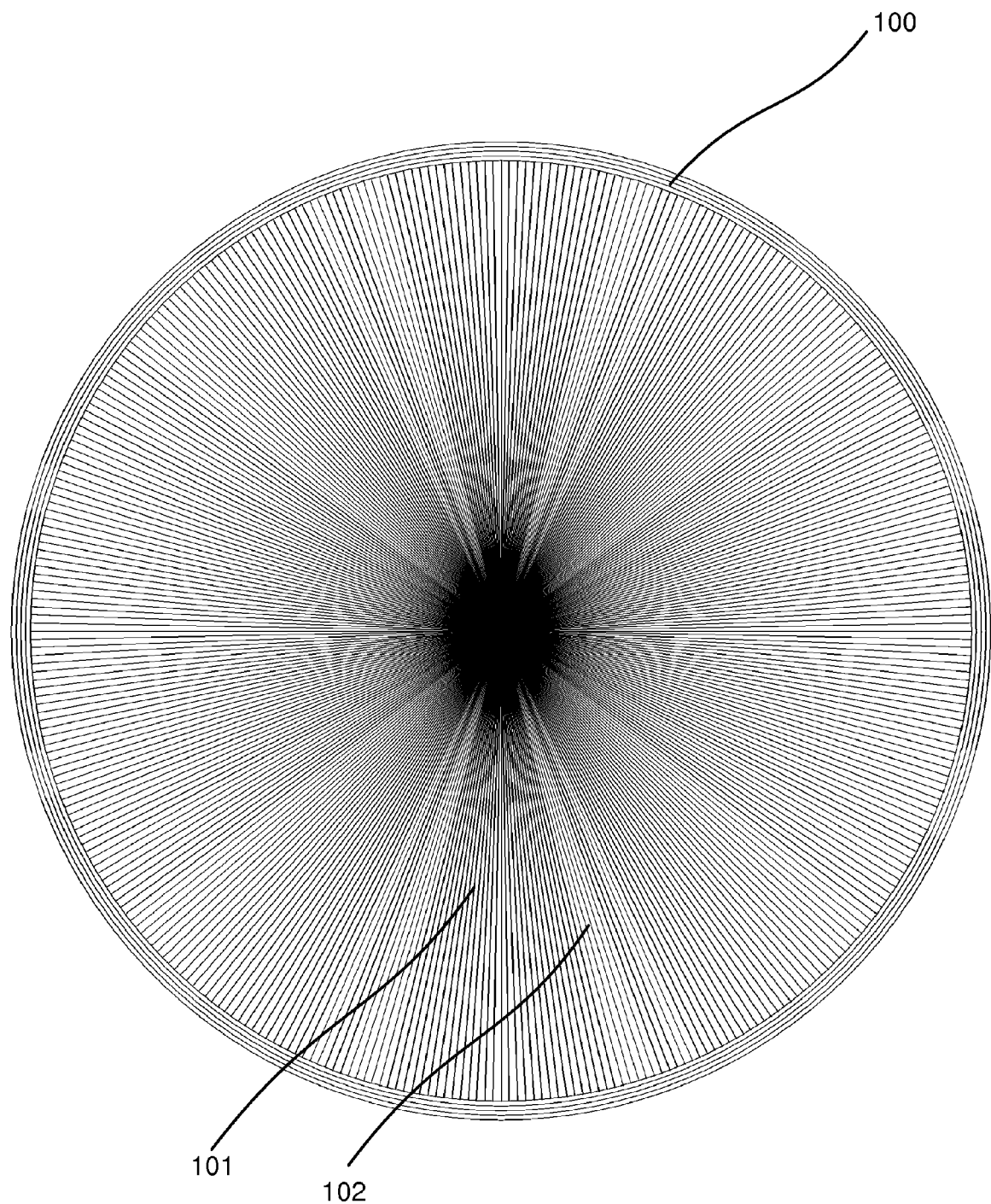
FIG. 1 is a rasterized image showing disadvantageous results of a conventional line stroking method.
Figure 6B:
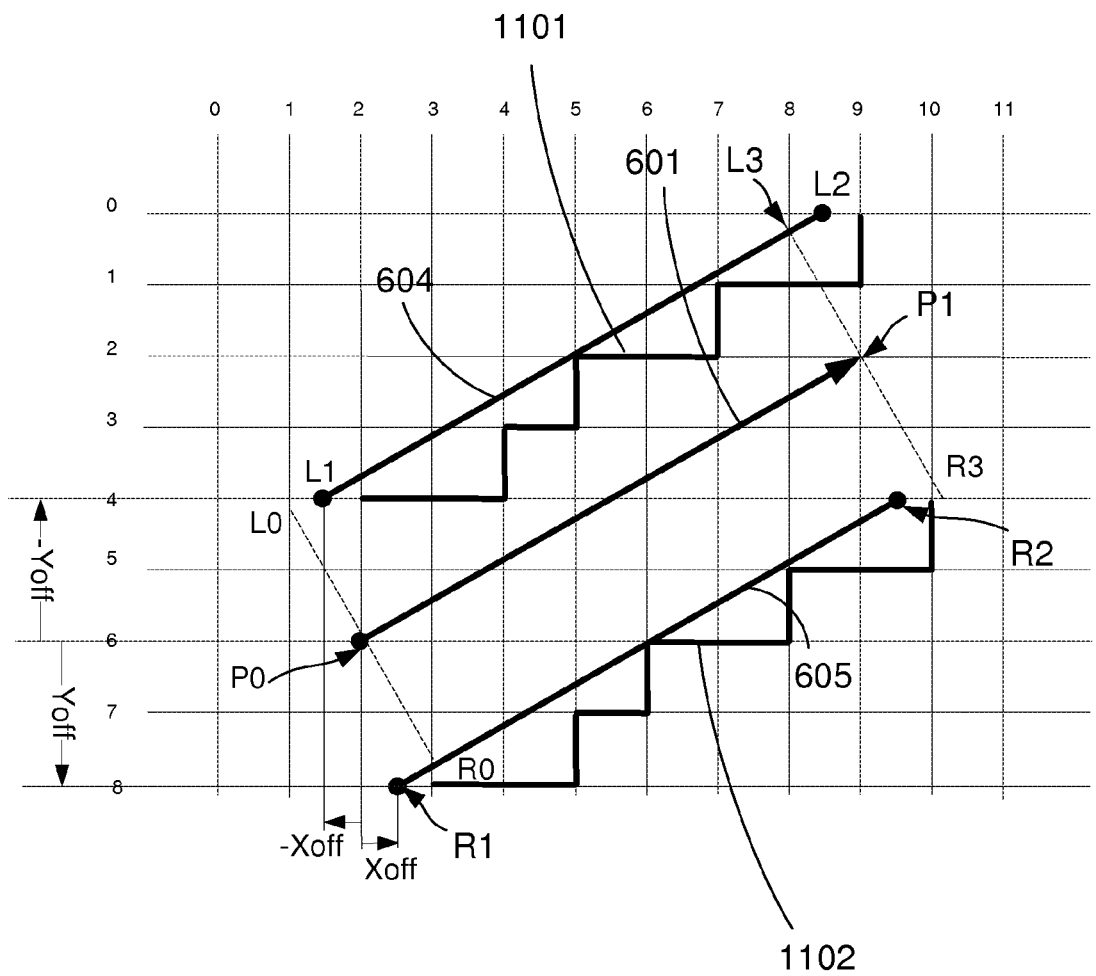
FIG. 6B is a diagram showing generated pixel aligned edges of the stroked line of FIG. 6A in accordance with an embodiment of the present invention.
Figure 7:
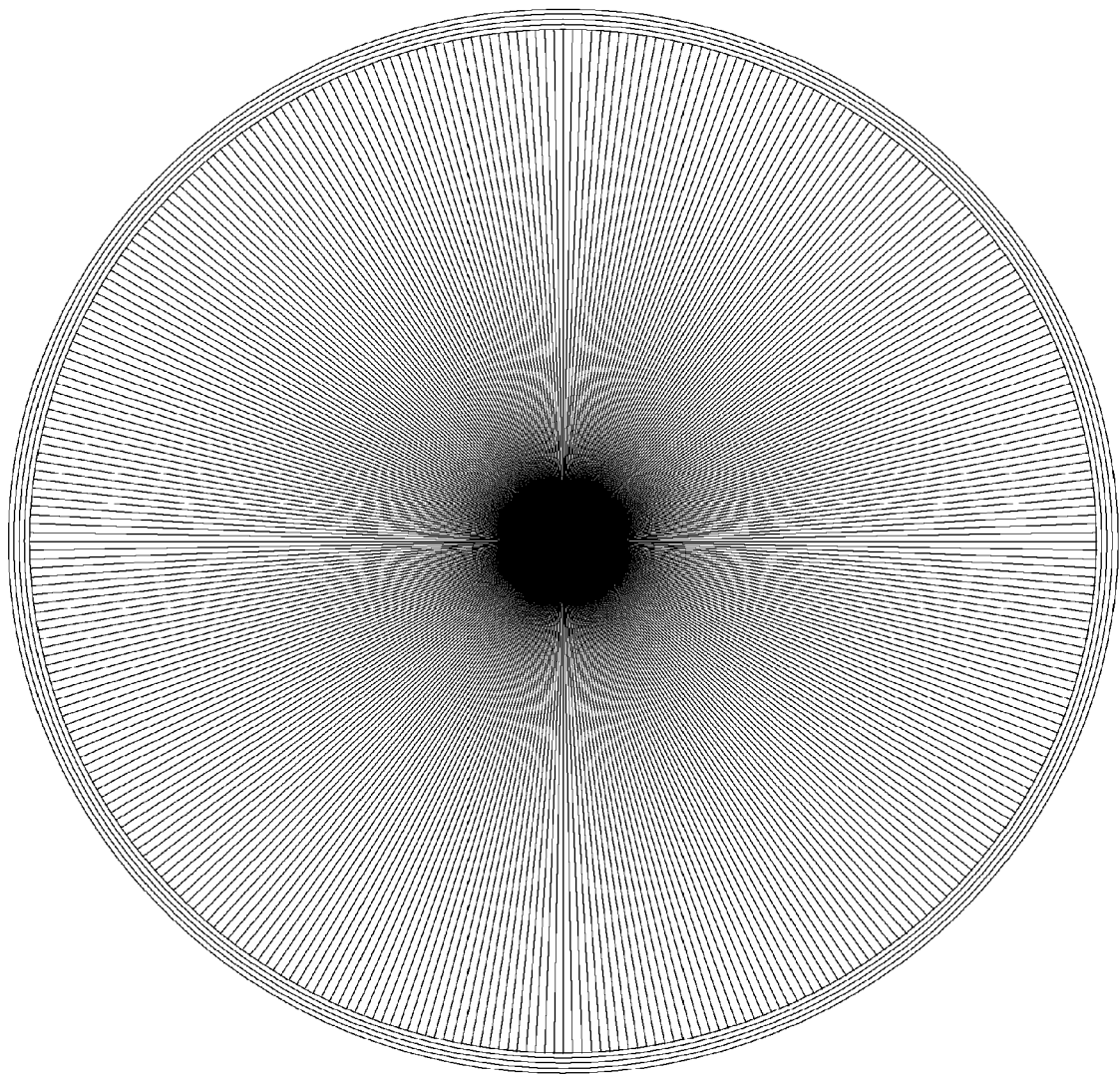
FIG. 7 is a rasterized image showing advantageous results of a line stroking method in accordance with an embodiment of the present invention.

Turning to FIG. 6B, once the lines 604 and 605 are obtained, the lines 604 and 605 are used to determine the pixel-aligned edges that define the stroked line 601 between P0 and P1 during processing by the Raster Image Processor (RIP). In an exemplary embodiment illustrated in FIG. 6B, Graphics Device Interface (GDI) rules are used to determine the pixel aligned edges 1101 and 1102. It is noted that the pixel aligned edges 1101 and 1102 are synchronous with each other. In other words, the pixel boundary 1101 is a replication of the pixel boundary 1102, separated by integer value 1 in the x-direction and integer value of width of the stroke line W in the y-direction. These synchronous changes in the pixel-aligned edges allow the width of the line to be maintained along the line as intended, resulting in the favourable result shown in FIG. 7. The outlines generated using this method are symmetrical about the centre stroking line P0-P1. Besides, the stroked lines in FIG. 7 are uniform across all angles, compared with the deficiencies 101 and 102 of FIG. 1.

It should also be noted that other rules for obtaining pixel aligned edges, such as the Printer Command Language (PCL)

and PostScript, would result in similarly favourable results even though the pixel aligned edges that are obtained may differ slightly.

In the example in FIG. 6B, the pixel boundary 1101 and the pixel boundary 1102 are generated from the line 604 (L1-L0) and the line 605 (R1-R2), respectively, by the Raster Image Processor (RIP) process 304. In this particular example, at a particular vertical scanline between the points R1 and R2, the x value of the pixel boundary 1102 is always the sum of the x value of the pixel boundary 1101 from the left adjacent scanline and the integer width W (4 pixels).

By choosing the offset vector [Xoff, Yoff] to generate the line 604 (L0-L1) and the line 605 (R0-R1), the line 604 and the line 605 will have properties that guarantee the fill area of the stroking line 601 will have an appearance of unique and uniform thickness compared with other known stroking methods.

Returning to the method of FIG. 4, step 404, which determines if the stroking line is horizontal or vertical, and step 405 for appending square ends follow the outline generation step 403. If the stroking line 601 is either horizontal or vertical, the method proceeds directly to step 406, which adds the outline to the display list; otherwise processing continues at step 405.

At step 405 end points L0, L3, R0, and R3 are determined to make the stroking outline appear square. This may be performed as follows:

determine point L0, which is the intersection of the line (L1-L2) 604 with the line perpendicular to the stroking line (P0-P1) 601 at point P0;

determine point L3, which is the intersection of the line (L1-L2) 604 with the line perpendicular to the stroking line (P0-P1) 601 at point P1;

determine point R0, which is the intersection of the line (R1-R2) 604 with the line perpendicular to the stroking line (P0-P1) 601 at point P0; and determine point R3, which is the intersection of the line (R1-R2) 604 with the line perpendicular to the stroking line (P0-P1) 601 at point P1.

In an alternative embodiment, the end points L0, L3, R0, and R3 may be determined in step 405 as follows:

Point L0, which is the intersection of the line (L1-L2) 604 with the line perpendicular to the line (P0-P1) 601 is determined. Then, utilising the symmetrical geometrical nature of the arrangement, points L3, R0, R3 may be determined using the following vector operations:

$$L3=L2+[L0-L1];$$

$$R0=R1-[L0-L1]; \text{ and}$$

$$R3=R2-[L0-L1].$$

The points generated in step 405 are representative of the left and right outlines for the stroking line 601, where the left outline is L0-L1-L2-L3 and the right outline is R0-R1-R2-R3. It is important to note that the points L0 and L3 may not always be collinear with the line (L1-L2) 604 due to x and y resolution limitations of the Raster Image Processor process (RIP) 304. Similarly, the points R0 and R3 may not always be collinear with the line (R1-R2) 605.

When the stroking line 601 is vertical or horizontal, the point L0 is identical to the point L1, the point L3 is identical to the point L2, the point R0 is identical to the point R1, and the point R3 is identical to the point L3. Hence, the points L0, L3, R0, R3 are not required to be computed.

Continuing on from step 405 of FIG. 4 into step 406, the Driver process 302 processes the left and right outlines and converts the outlines into a suitable Display List 303 format.

For example, the left outline L0-L1-L2-L3 may be appended to the reverse of the right outline R0-R1-R2-R3 to form a closed shape or fill area in the clockwise direction L0-L1-L2-L3-R3-R2-R1-R0-L0. Alternatively the closed shape or fill area having outline R0-R1-R2-R3-L3-L2-L1-L0-R0 may be formed in the anticlockwise direction. The method of FIG. 4 terminates at step 407.

The method of FIG. 4 may be adapted to generate an outline for the stroking line 601 with square end caps or another style of end caps, instead of the butt end caps generated in step 405. The end cap style may be specified by the Application process 301.

A line stroked in accordance with the method of FIG. 4 will not generally have an actual width of W. That is, the distance between the input line and each of the parallel outlines will not be exactly W/2. Rather, the distance between the input line and each of the parallel outlines is a function of the offset vector and the angle of inclination of the input line. The actual width of the stroked line can be calculated as follows:

$$W_{actual}=|\text{offset}|\sin(\theta)$$

where:

theta is the angle between the offset vector and the stroking line vector P0-P1; and $$|\text{offset}|=\text{sqrt}(W*W+1).$$

FIG. 7 shows advantageous results achieved by application of a line stroking method in accordance with an embodiment of the present invention. More specifically, FIG. 7 shows consistency of line thickness for stroked line of various inclinations and/or directions. A comparison of FIG. 7 and FIG. 2 (prior art results) shows that application of a line stroking method in accordance with an embodiment of the present invention advantageously eliminates or reduces the stroked line thickness inconsistencies produced by prior art methods.

Figure 8:
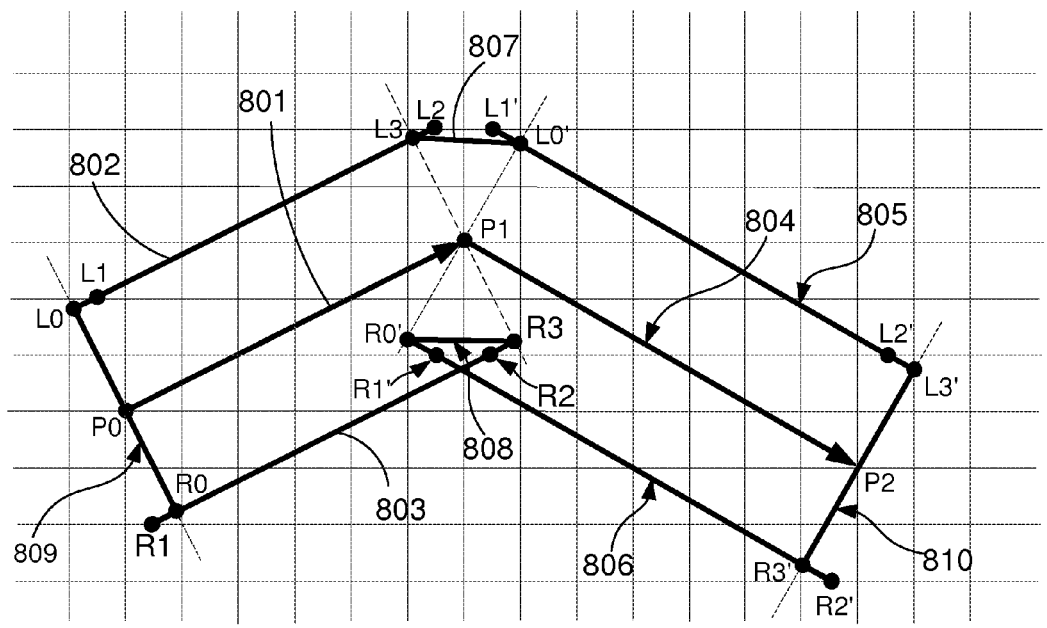
FIG. 8 is a diagram showing generation of two adjoining stroked lines in accordance with an embodiment of the present invention.

Furthermore, a stroked outline may be generated for two adjoining stroking lines which have a common point, using a specified join style. FIG. 8 shows an example of application of the method of FIG. 4 where the Application process 301 requests the Driver process 302 to generate a stroked outline for the two adjoining stroking lines 801 (P0-P1) and 804 (P1-P2) with a "bevel" join and "butt" end caps.

The Driver process 302 executes the method of FIG. 4 to generate outlines for the stroking line 810. The results are the left outline 802 comprising the points L0, L1, L2, and L3, and the right outline 803, comprising the points R0, R1, R2, and R3.

The Driver process 302 also executes the method of FIG. 4 to generate outlines for the stroking line 804. The results are the left outline 805 comprising the points L0', L1', L2', and L3', and the right outline 806 comprising the points R0', R1', R2', and R3'.

The "bevel" join is generated by joining the left outline 802 of the stroking line 801 with the left outline 805 of the stroking line 804 by adding the line 807 (L3-L0') and joining the right outline 803 of the stroking line 801 with the right outline 806 of the stroking line 804 by adding the line 808 (R3-R0').

The butted end caps are generated by adding lines 809 (L0-R0) and 810 (L3'-R3').

The result is a closed outline: L0-L1-L2-L3-L0'-L1'-L2'-L3'-R3'-R2'-R1'-R0'-R3-R2-R1-R0-L0 in the clockwise order. The Driver process 302 can use this closed outline to generate the Display List 303.

A more general embodiment of the present invention relating to generation of an outline for a stroked line of specified width from an input line defined by a vector having two input points is now described with reference to FIG. 9.

Figure 9:
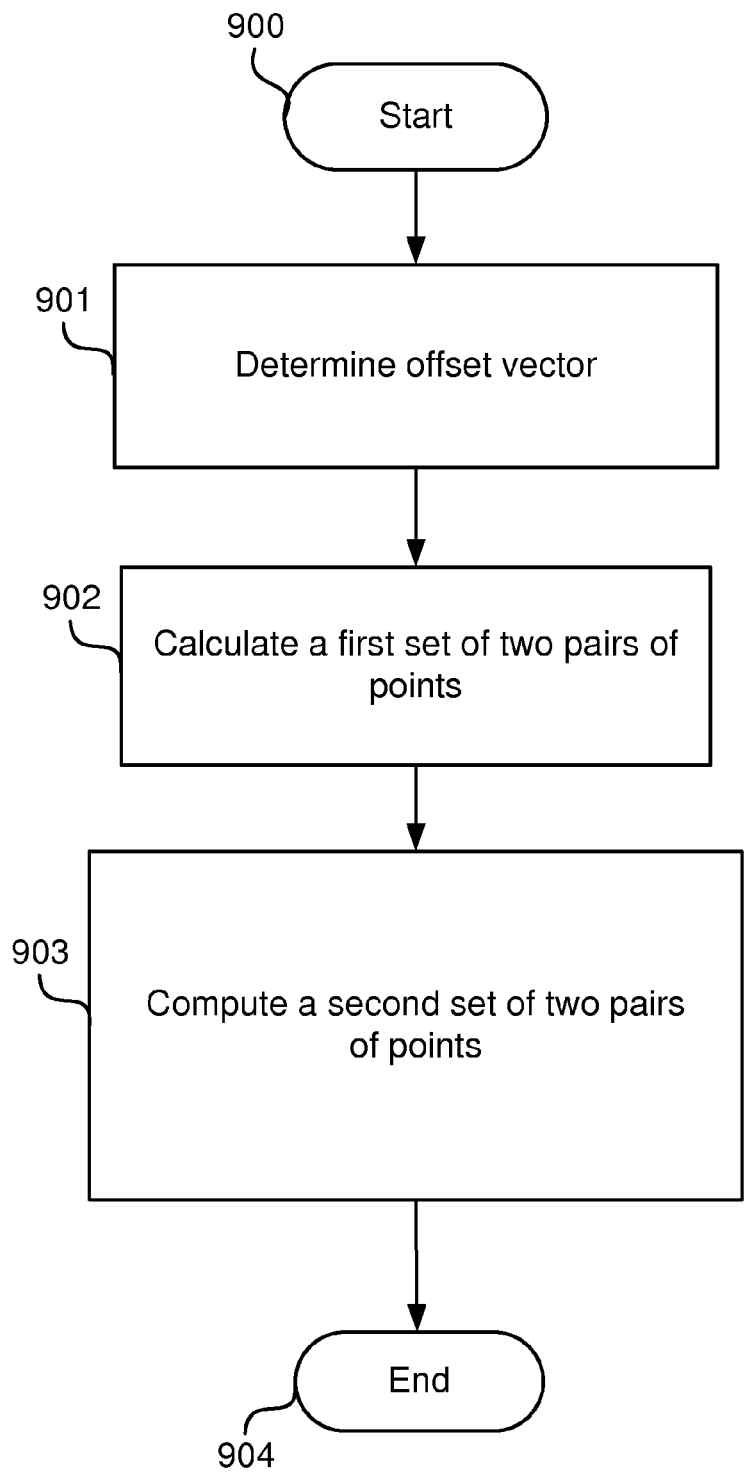
FIG. 9 is a schematic flow diagram of a method for generating an outline of a stroked line in accordance with an embodiment of the present invention.

Referring to FIG. 9, the method begins at step 900.

An offset vector having components (Xoff, Yoff) is determined at determining step 901 based on the vector or input line. The offset vector may be determined based on the inclination and direction of the vector or input line, for example, by (i) determining which octant in a plane of the input line the vector lies in; and (ii) determining the offset vector based on the determined octant.

At calculating step 902, a first set of two pairs of points are calculated based on the offset vector applied to each of the two input points of the vector.

At computing step 903, a second set of two pairs of points are computed based on the first set of points. For example, the second set of two pairs of points may be computed by projecting each of the two pairs of the first set of points onto second and third lines perpendicular to the input line. The second and third lines intersect the input line at the two input points. Alternatively, the second set of two pairs of points can be computed by calculating one of the second set of points, and determining a vector to this point from a nearest point of a first set of points. Then, using this vector, the other three points of the second set can be determined.

The second set of two pairs of points define at least a portion of the outline for the stroked line and one of the components of the offset vector [Xoff, Yoff] is independent of the inclination of the vector and the specified width of the stroked line.

The method of FIG. 9 ends at step 904.

In the methods of FIG. 4 and FIG. 9, each of the first set of two pairs of points defines a respective line parallel or substantially parallel to the input line. Each of the parallel or substantially parallel lines is disposed on an opposite side of the input line and is equidistant or substantially equidistant to the input line. Use of the term "substantially" is intended to encompass small variances such as those resulting from the finite resolution of the Raster Image Processor (RIP) or target rendering device.

Figure 10:
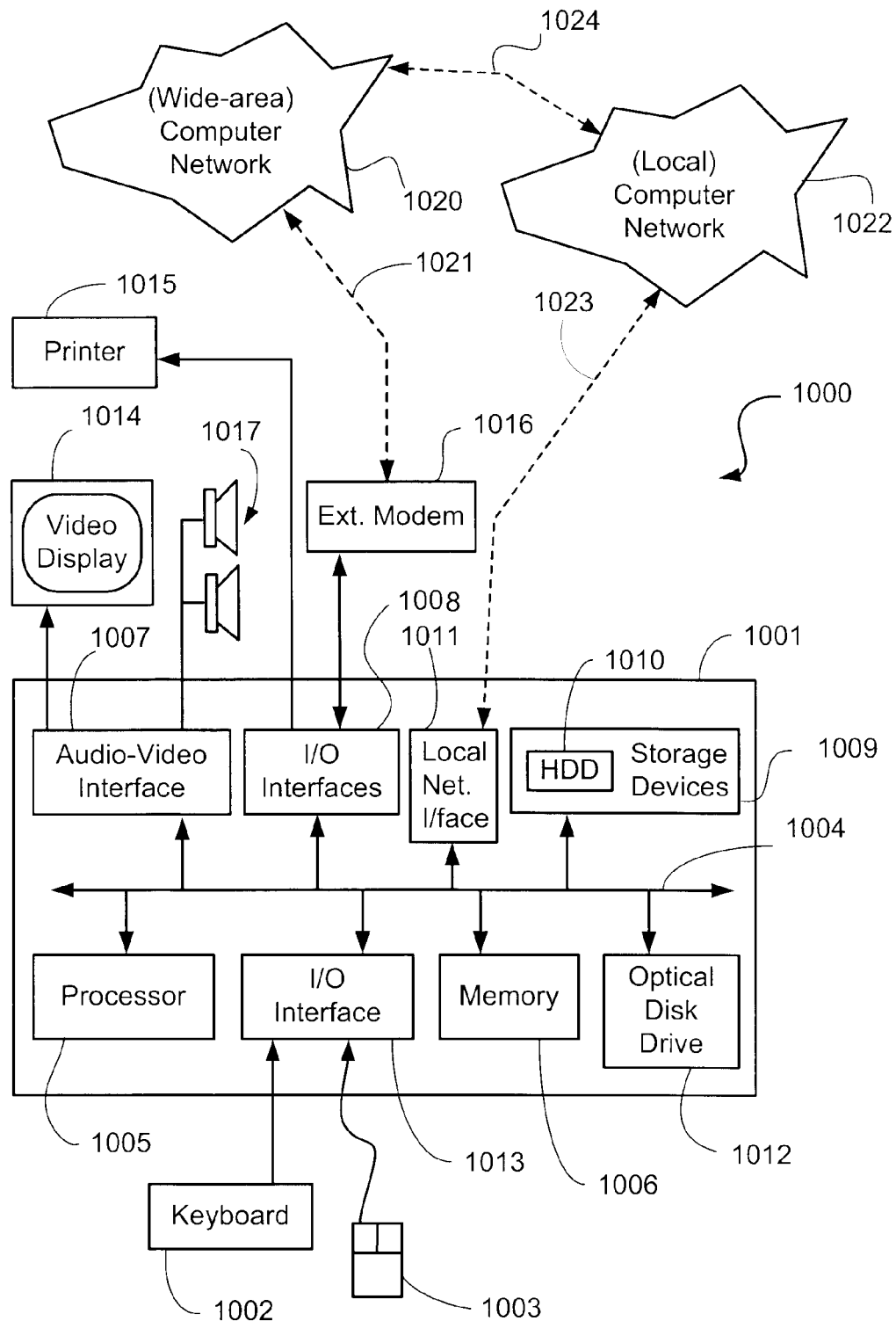
FIG. 10 is a schematic block diagram of a computer system with which embodiments of the present invention may be practised.

The methods described herein may be implemented using a computer system such as the computer system 1000 shown in FIG. 10. The methods may be implemented as software, such as one or more application programs executable within the computer system 1000. More specifically, the steps of the method of FIG. 4 and the steps of the more general embodiment described immediately hereinbefore may be effected by instructions in the software that are carried out within the computer system 1000 by at least one programmed processor. The instructions may be formed as one or more code modules, each for performing one or more particular tasks. The software may be stored in a computer readable medium, including the storage devices described below, for example. The software is loaded into the computer system 1000 from the computer readable medium, and then executed by the computer system 1000. A computer readable medium having such software or computer program recorded on it is a computer program product. The use of the computer program product in the computer system 1000 preferably effects an advantageous apparatus for implementing or performing the methods described herein.

As seen in FIG. 10, the computer system 1000 is formed by a computer module 1001, input devices such as a keyboard 1002 and a mouse pointer device 1003, and output devices including a printer 1015, a display device 1014 and loudspeakers 1017. An external Modulator-Demodulator (Modem) transceiver device 1016 may be used by the computer module 1001 for communicating to and from a communications network 1020 via a connection 1021. The network 1020 may be a wide-area network (WAN), such as the Internet or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the network 1020.

The computer module 1001 typically includes at least one processor unit 1005, and a memory unit 1006 for example formed from semiconductor random access memory (RAM) and/or read only memory (ROM). The processor 1005 includes a number of functional modules including a control unit, an arithmetic logic unit (ALU), and a local or internal memory, sometimes called a cache memory. The cache memory typically includes a number of storage registers in a register section. One or more internal buses functionally interconnect these functional modules. The processor 1005 typically also has one or more interfaces for communicating with external devices via the system bus, using a connection. The module 1001 also includes an number of input/output (I/O) interfaces including an audio-video interface 1007 that couples to the video display 1014 and loudspeakers 1017, an I/O interface 1013 for the keyboard 1002 and mouse 1003 and optionally a joystick (not illustrated), and an interface 1008 for the external modem 1016 and printer 1015. In some implementations, the modem 1016 may be incorporated within the computer module 1001, for example within the I/O interface 1008. The computer module 1001 also has a local network interface 1011 which, via a connection 1023, permits coupling of the computer system 1000 to a local computer network 1022, known as a Local Area Network (LAN). As also illustrated, the local network 1022 may also couple to the wide network 1020 via a connection 1024, which would typically include a so-called "firewall" device or similar functionality. The interface 1011 may, for example, be formed by an Ethernet™ circuit card, a wireless Bluetooth™ or an IEEE 802.11 wireless arrangement.

The interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other devices such as a floppy disk drive and a magnetic tape drive (not illustrated) may also be used. An optical disk drive 1012 is typically provided to act as a non-volatile source of data. Portable memory devices, such optical disks (e.g.: CD-ROM, DVD), USB-RAM, and floppy disks for example may then be used as appropriate sources of data to the system 1000.

The components 1005 to 1013 of the computer module 1001 typically communicate via an interconnection bus 1004 and in a manner which results in a conventional mode of operation of the computer system 1000 known to those skilled in the relevant art. Examples of computers on which the described arrangements can be practised include IBM-PC's and compatibles, Sun Sparcstations, Apple Mac™ or similar computer systems evolved therefrom.

Typically, the application programs, which execute the driver process 302 of FIG. 3 to generate the outlines of the input stroke lines discussed hereinbefore with reference to FIGS. 2 to 9, are resident on the hard disk drive 1010 and read and controlled in execution by the processor 1005. Intermediate storage of such programs and any data fetched from the networks 1020 and 1022 may be accomplished using the semiconductor memory 1006, possibly in concert with the hard disk drive 1010. In some instances, the application programs may be supplied to the user encoded on one or more CD-ROM and read via the corresponding drive 1012, or alternatively may be read by the user from the networks 1020 or 1022. Still further, the software can also be loaded into the computer system 1000 from other computer readable media or another device. The method of producing the outlines can be executed through the instructions in the software. The software instructions may be formed as one or more code modules, each for performing one or more particular tasks. The software may also be divided into at least two separate parts, in which a first part performs the outline generation methods, and a second part manages an interface between the processor and the output device or users. Computer readable media refers to any storage medium or device that participates in providing instructions and/or data to the computer system 1000 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1001. Examples of computer readable transmission channels that may also participate in the provision of instructions and/or data include radio or infra-red transmission channels as well as a network connection to another computer or networked device, and the Internet or Intranets including e-mail transmissions and information recorded on Websites and the like.

The application program resident on the storage devices 1009 includes a sequence of instructions that may include conditional branch and loop instructions. The program may also include data which is used in execution of the program. The instructions and the data are stored in memory 1006. Depending upon the relative size of the instructions and the memory locations, a particular instruction may be stored in a single memory location as depicted by the instruction shown in the memory location. Alternately, an instruction may be segmented into a number of parts each of which is stored in a separate memory location within the memory 1006.

In general, the processor 1005 is given a set of instructions which are executed therein. The processor 1005 then waits for a subsequent input, to which it reacts to by executing another set of instructions. Each input may be provided from one or more of a number of sources, including data generated by one or more of the input devices 1002, 1003, data received from an external source across one of the networks 1020, 1022, data retrieved from one of the storage devices 1006, 1009 or data retrieved from a storage medium inserted into the corresponding reader 1012. The execution of a set of the instructions may in some cases result in output of data. Execution may also involve storing data or variables to the memory 1006.

The disclosed line stroking method can use input variables that are stored in the memory 1006. The line stroking arrangements produce output variables that are stored in the memory 1006.

The register section, the arithmetic logic unit (ALU), and the control unit of the processor 1005 work together to perform sequences of micro-operations needed to perform "fetch, decode, and execute" cycles for every instruction in the instruction set making up the program resident on the storage device 1009. Each fetch, decode, and execute cycle comprises:

(a) a fetch operation, which fetches or reads an instruction from a memory location;

(b) a decode operation in which the control unit determines which instruction has been fetched; and (c) an execute operation in which the control unit and/or the ALU execute the instruction.

Thereafter, a further fetch, decode, and execute cycle for the next instruction may be executed. Similarly, a store cycle may be performed by which the control unit stores or writes a value to a memory location.

Each step or sub-process in the processes or methods described hereinbefore with reference to FIGS. 2 to 9 is associated with one or more segments of the program, and is performed by the register section, the ALU, and the control unit in the processor 1005 working together to perform the fetch, decode, and execute cycles for every instruction in the instruction set for the noted segments of the program.

The methods described herein may alternatively be implemented in dedicated hardware such as one or more integrated circuits. Such dedicated hardware may include graphic processors, digital signal processors, or one or more microprocessors and associated memories, which may form part of a graphics engine or graphics rendering system. In particular, the methods described herein may be implemented in an embedded processing core comprising memory and one or more microprocessors.

The foregoing describes only some embodiments of the present invention, and modifications and/or changes can be made thereto without departing from the scope and spirit of the invention, the embodiments being illustrative and not restrictive.

INDUSTRIAL APPLICABILITY

It is apparent that the arrangements described herein are applicable to the computer and data processing industries. For example, the methods, systems and computer programs described hereinbefore may be implemented in computer systems, cameras, printers, and other apparatuses that are capable of rendering graphic images.

What is claimed is:

1. A method performed by a raster-graphics imaging apparatus, including a memory and a processor coupled to the memory, which generates an outline for a stroked line of a specified width in a digital image, the method comprising the steps of:

based on an input line defined by an input vector that has two input points, determining, with the processor, an offset vector, the offset vector having components [Xoff, Yoff];

calculating, with the processor, a first set of two pairs of points based on the offset vector applied to the two input points of the input vector; and computing, with the processor, a second set of two pairs of points based on the first set of points; and storing the two sets of two pairs in the memory of the raster-graphics imaging apparatus, wherein the second set of two pairs of points define at least a portion of the outline, and one component of the offset vector [Xoff, Yoff] is independent of the inclination of the input vector and the width specified for the stroked line.

2. The method of claim 1, wherein said step of determining the offset vector comprises the sub-steps of:

determining which octant in a plane of the input line the input vector lies in; and determining the offset vector based on the determined octant.

3. The method of claim 1, wherein the second set of two pairs of points is determined based on a projection of the first set of points onto a second line and a third line, each of the second and third lines perpendicular to the input line and intersecting the input line at the two input points of the input vector.

4. The method of claim 1, wherein the first set of two pairs of points define respective lines substantially parallel to, on opposite sides of, and substantially equidistantly to the input line.

5. The method of claim 1, wherein one of the offset vector components [Xoff, Yoff] comprises a constant value of 0.5 and the other of the offset vector components comprises a value of half of the specified width.

6. The method of claim 5,
wherein the offset vector is in the form N*[Xoff, Yoff], and
wherein N is a positive integer less than the greater of the absolute x value and absolute y value of the input vector.

7. The method of claim 1, further comprising the step of adding at least one end cap to the second set of two pairs of points.

8. A method for generating an outline for two stroked lines by combining two outlines each generated according to the method of claim 1 performed by the raster-graphics imaging apparatus, said method comprising the steps of:
joining one point of each of the two pairs of the second set of a first of the input lines with one point of one of the two pairs of the second set of a second of the input lines; and
adding an end cap to two points respectively of the two pairs of the second set of each of the input lines.

9. A raster-graphics imaging apparatus for generating an outline for a stroked line of a specified width in a digital image to be used in said raster-graphics imaging apparatus, said apparatus comprising:
memory for storing data and instructions to be performed by a processor; and
at least one processor coupled to said memory, said at least one processor programmed to:
based on an input line defined by an input vector that has two input points, determine an offset vector, the offset vector having components [Xoff, Yoff];
calculate a first set of two pairs of points based on the offset vector applied to the two input points;
compute a second set of two pairs of points based on the first set of points; and
store the two sets of two pairs in the memory, wherein the second set of two pairs of points define at least a portion of the outline, and
one component of the offset vector [Xoff, Yoff] is independent of the inclination of the input vector and the width specified for the stroked line.

10. The raster-graphics imaging apparatus of claim 9, wherein said at least one processor is further programmed to:
determine which octant in a plane of the input line the input vector lies in; and
determine the offset vector based on the determined octant.

11. The raster-graphics imaging apparatus of claim 9, wherein the second set of two pairs of points is determined based on a projection of the first set of points onto a second line and a third line, each of the second and third lines perpendicular to the input line and intersecting the input line at the two input points of the input vector.

12. The raster-graphics imaging apparatus of claim 9, wherein the first set of two pairs of points define respective lines substantially parallel to, on opposite sides of, and substantially equidistantly to the input line.

13. The raster-graphics imaging apparatus of claim 9, wherein one of the offset vector components [Xoff, Yoff] comprises a constant value of 0.5 and the other of the offset vector components comprises a value of half the specified width.

14. A raster-graphics imaging apparatus for generating an outline for two stroked lines by combining two outlines each generated by the raster-graphics imaging apparatus of claim 9, said apparatus comprising:
memory for storing data and instructions to be performed by a processor; and
at least one processor coupled to said memory, said at least one processor programmed to:
join one point of each of the two pairs of the second set of a first of the input lines with one point of one of the two pairs of the second set of a second of the input lines; and
add an end cap to two points respectively of the two pairs of the second set of each of the input lines.

15. A non-transitory computer-readable storage medium storing an executable computer program for causing a raster-graphics imaging apparatus, including a memory and a processor coupled to the memory, to execute a method which generates an outline for a stroked line of a specified width in a digital image to be used in the raster-graphics imaging apparatus, the method comprising:
based on an input line defined by an input vector that has two input points, determining an offset vector, the offset vector having components [Xoff, Yoff];
calculating a first set of two pairs of points based on the offset vector applied to the two input points;
computing a second set of two pairs of points based on the first set of points; and
storing the two sets of two pairs in a memory of the raster-graphics imaging apparatus, wherein
the second set of two pairs of points define at least a portion of the outline; and
one component of the offset vector [Xoff, Yoff] is independent of the inclination of the input vector and the width specified for the stroked line.

16. The storage medium of claim 15, said method further comprising:
determining which octant in a plane of the input line the input vector lies in; and
determining the offset vector based on the determined octant.

17. The storage medium of claim 15, wherein the second set of two pairs of points is determined based on a projection of the first set of points onto a second line and a third line, each of the second and third lines perpendicular to the input line and intersecting the input line at the two input points of the input vector.

18. The storage medium of claim 15, wherein the first set of two pairs of points define respective lines substantially parallel to, on opposite sides of, and substantially equidistantly to the input line.

19. The storage medium of claim 15, wherein one of the offset vector components [Xoff, Yoff] comprises a constant value of 0.5 and the other of the offset vector components comprises a value of half the specified width.

20. A non-transitory computer-readable storage medium storing an executable computer program for causing a raster-graphics imaging apparatus, including a memory and a processor coupled to the memory, to execute a method for generating an outline for two stroked lines by combining two outlines each generated according to the method for the raster-graphics imaging apparatus of claim 15, said method comprising the steps of:

joining one point of each of the two pairs of the second set of a first of the input lines with one point of one of the two pairs of the second set of a second of the input lines; and adding an end cap to two points respectively of the two pairs of the second set of each of the input lines.

* * * * *